(12) United States Patent
Paksoy et al.

(10) Patent No.: US 12,442,947 B2
(45) Date of Patent: Oct. 14, 2025

(54) VEHICLE MOUNTED METAL AND MINE DETECTOR

(71) Applicant: TUBITAK, Ankara (TR)

(72) Inventors: Mehmed Akif Paksoy, Kocaeli (TR); Nihat Kavakli, Kocaeli (TR); Ahmet Akgöz, Kocaeli (TR); Eyüp Çuğalir, Kocaeli (TR); Ersin Özkan, Kocaeli (TR); Hakki Nazli, Kocaeli (TR)

(73) Assignee: TUBITAK, Ankara (TR)

( * ) Notice: Subject to any disclaimer, the term of this patent is extended or adjusted under 35 U.S.C. 154(b) by 506 days.

(21) Appl. No.: 17/639,174

(22) PCT Filed: Aug. 31, 2020

(86) PCT No.: PCT/IB2020/058095
§ 371 (c)(1),
(2) Date: Feb. 28, 2022

(87) PCT Pub. No.: WO2021/038537
PCT Pub. Date: Mar. 4, 2021

(65) Prior Publication Data
US 2022/0350045 A1 Nov. 3, 2022

(30) Foreign Application Priority Data
Aug. 29, 2019 (TR) .................................. 2019/13129

(51) Int. Cl.
*G01V 3/15* (2006.01)
*F41H 11/136* (2011.01)
*H04W 4/40* (2018.01)

(52) U.S. Cl.
CPC ............. *G01V 3/15* (2013.01); *F41H 11/136* (2013.01); *H04W 4/40* (2018.02)

(58) Field of Classification Search
CPC . G01V 3/15; H04W 4/40; F41H 11/12; F41H 11/13; F41H 11/16; F41H 11/22; F41H 11/136
See application file for complete search history.

(56) References Cited

U.S. PATENT DOCUMENTS 6,026,135 A 2/2000 McFee et al.
6,445,334 B1* 9/2002 Bradley .................. G01S 13/90
342/195

(Continued)

FOREIGN PATENT DOCUMENTS

EP 1972964 9/2008

*Primary Examiner* — Thang X Le
(74) *Attorney, Agent, or Firm* — Bradley D. Crose; Crose Law LLC

(57) ABSTRACT

The invention is related to a vehicle mounted metal and mine detector, which is used in the operations with military or humanitarian purposes regarding the clearance or removal of landmines for detecting mines with high metal content and plastic mines with a minimum content of metal that are near the ground surface or buried underground, as well as any improvised explosive devices, ammunitions and explosives; in the archaeological researches for determining the location of the buried archaeological remains without damaging them; in the geophysical studies for the exploration of mineral deposits, industrial minerals and rock formations; and in the detection of infrastructure elements such as underground pipelines and cables. The system is comprised of a manned or unmanned ground vehicle (8), a lower arm (2) and an upper arm (3) that are connected to the lower shell (7) of the vehicle by means of rotating links, a search head (1) in which electromagnetic interference (EMI) sensor coils and ground penetrating radar (GPR) antennas are arranged to be nested inside one another, fore arms (9) that are fastened directly on the search head (1) or into the ribs (13)

(Continued)

Figure 1:
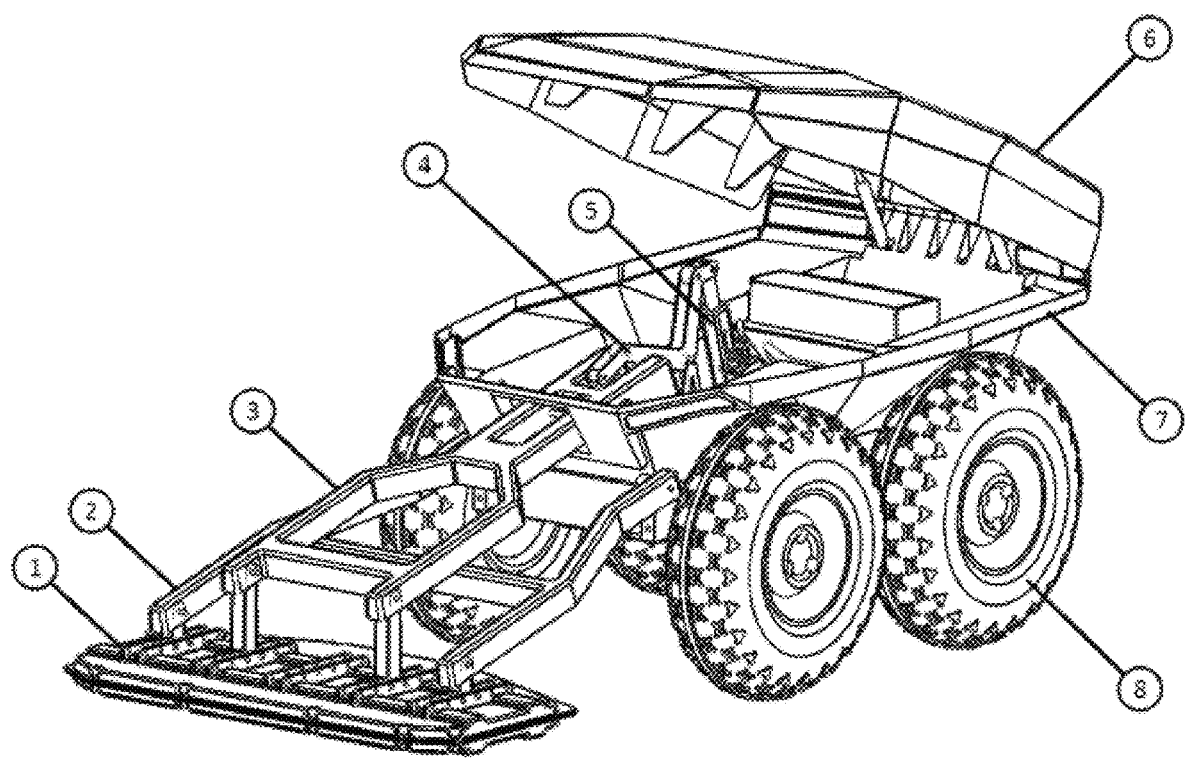

placed on the search head and that enable the search head (1) to be connected to the lower arm (2) and to the upper arm (3) by means of the quick-connect rotating connection components, a linear actuator (5) and a lever arm (4) that are connected to either one of the lower arm (2) and the upper arm (3) with rotating links for adjusting the height of the search head (1) from the ground, and an upper shell (6) covering the last-mentioned mechanisms for protecting them against external factors. While adjusting the height of the search head (1) from the ground, at the same time, it is kept parallel to the ground, and these two functions are carried out by using only one linear actuator (3). Through the arrangement of the sensors in the search head such that the sensors are arrayed in pairs nested one another, the dimensions of the search head are kept as small as possible, providing the ease of use in narrow areas where the detection operation is carried out. When the search head is damaged, the connection components are broken off by themselves and the search head is broken off from the vehicle due to the connection of the search head (1) to the lower arm (2) and the upper arm (3) by means of the quick-connect connection components, which prevents the rest of the vehicle from being damaged by protecting it against the damaging effects. Furthermore, the damaged search head can be replaced easily and quickly with a new one on site without the need for any special equipment, therefore the vehicle has the ability to operate for a long time.

12 Claims, 4 Drawing Sheets

(56) References Cited

U.S. PATENT DOCUMENTS

| | | | |
|---|---|---|---|
| 6,809,520 B1* | 10/2004 | Nelson | G01V 3/15 89/1.13 |
| 7,173,560 B2* | 2/2007 | Li | F41H 11/12 324/326 |
| 7,467,810 B2 | 12/2008 | Leggatt | |
| 8,374,754 B2 | 2/2013 | Clodfelter | |
| 2003/0034778 A1* | 2/2003 | Nelson | G01V 3/15 324/329 |
| 2003/0196543 A1* | 10/2003 | Moser | F41H 11/16 89/1.13 |
| 2006/0130593 A1* | 6/2006 | Richards | G01V 3/15 73/856 |
| 2008/0036644 A1 | 2/2008 | Skultety-Betz et al. | |
| 2014/0007756 A1* | 1/2014 | Diaz | F41H 11/16 89/36.01 |

* cited by examiner

VEHICLE MOUNTED METAL AND MINE DETECTOR

TECHNICAL FIELD OF THE INVENTION

The invention is related to a modular, vehicle mounted metal and mine detector, including sensor or sensor combinations according to features of the object to be detected, which can be used for detection and identification of buried metal or non-metal anti-tank (AT) and anti-personnel (AP) mines, improvised explosive devices (IED), explosive hazard devices (EHD), explosive ordnance (EO) and explosive remnants of war (ERW) during military or humanitarian mine clearance (demining) operations; for determining the locations of manhole covers, valves, grids, pipes and cables those have been underneath the asphalt during infrastructural works by municipalities, telephone companies, power and water distribution institutions, and in asphalt control studies; and locating and monitoring the locations of archaeological structures, geological units and industrial remains buried underground.

PRIOR ART

Technologies used for detecting landmines aim to reach the highest probability of detection (Pd) and the lowest false alarm rate (FAR) at a high speed without endangering the life safety of the personnel; depending on some parameters such as the type of the mine, the field conditions to be scanned and whether the detection takes place under time pressure (during or after the war). Current mine detection systems include hand-held, vehicle-mounted, airborne and mechanical clearing devices. Hand-held mine detection systems endanger the life safety of the personnel engaged in scanning activities, in the event of a possible explosion or enemy fire. The scanning speed of hand-held systems, which are intended to be used especially in places where the vehicle-mounted mine detection systems cannot reach, is very low compared to other systems because it depends on the speed of the user. Vehicle-mounted mine detection systems are used to detect and locate the mines, by applying low pressure to the ground, so as not to cause the explosion of anti-tank (AT) mines sensitive to high pressures which are trapped underground to damage the vehicles, and they have higher scanning speeds. However, anti-personnel (AP) mines, which are sensitive to lower pressures, can easily explode during the scanning activity because of the pressure applied by vehicle-mounted mine detection systems and cause great damage to the sensors in the vehicle and the parts of the vehicle carrying the sensors. For this reason, the parts of the vehicle-mounted mine detection systems are designed in a modular fashion, so that the damaged sensors or parts carrying the sensors can be quickly replaced or repaired in the field in case of an explosion and made ready for use again, thus giving the system the ability to operate for a long period of time. Although the scanning speeds of airborne mine detection systems are quite high, they have a lower probability of detection (Pd) and a higher false alarm rate (FAR) than other mine detection systems since they operate too high above the ground to detect mines accurately. Mechanical clearing systems, which include armored vehicles such as mine rollers and mine plows, advance in front of military vehicles and ensure mine-clearance on the crossing route; and when the war is over, they are also used in humanitarian mine-clearance activities of large-scaled areas in a short time and ensure residential options in those areas again. However, mechanical cleaning systems don't have a 100% cleaning success; on top of it, they make the land infertile by causing major damage to the soil and vegetation in the scanned area.

A wide variety of sensor technologies are used in mine scanning systems. Some of these are Electromagnetic Interference—EMI, Ground Penetrating Radar—GPR), Infrared Imaging—IR, Microwave Radiometer—MWR, Thermal Neutron Activation—TNA and biosensors. Although EMI technology-based metal detectors have a high probability of detecting (Pd) metal-containing mines, in areas where military operations have been carried out or bombed, there are also small metal pieces such as bullet casings and shrapnel fragments that are undesirable to be detected or targeted by these metal objects. Therefore, false detection signals caused by these small metal objects cause metal detectors (EMI) to have a high false alarm rate (FAR). In addition, since mines with high metal content can be easily detected by metal detectors, today, especially destructive explosive anti-personnel (AP) mines are produced using plastic materials with a very low or no metal content. EMI sensor and one or more different types of sensors are used together in mine detection systems because metal detectors fail to detect plastic mines with low metal content and give false alarms by creating the wrong perception that non-target metal objects in the ground are threats. In this way, all data from the EMI sensor and other sensors are combined and evaluated together and the target detection/diagnosis performance is increased by distinguishing whether the incoming signal is from the target source or not. While a high-frequency electromagnetic signal is sent underground through the GPR transmitter antenna, the signals reflected back to the surface from irregularities with different dielectric properties are collected through the GPR receiver antenna, and the collected signals are processed with automatic target recognition (ATR) algorithms, thus the source of magnetic irregularities are determined and classified. In addition, the data collected simultaneously with the GPR measurements in the scanned target area can be visually followed on a display screen. As in the invention subject to the present patent application, in mine detection systems where dual sensor technology is used, which includes EMI sensor and GPR sensor together; thanks to the simultaneous operation of the GPR sensor, which allows high-resolution underground data to be received, integrated with the EMI sensor, it is possible to detect and diagnose plastic mines and handmade explosives (IED) with low or zero metal content that cannot be detected by using only the metal detector (EMI). In addition, false alarms caused by non-target metal particles in the ground such as shrapnel and empty casings, which are detected as targets by the metal detector due to their metal content, are prevented. In this respect, the metal-mine detector mounted on the vehicle in which the dual-sensor technology, which is the subject of the present patent application, is used, has a high target detection probability (Pd) and a low false alarm rate (FAR).

In the prior art, US patent document numbered U.S. Pat. No. 8,374,754 B2 discloses an apparatus, comprising an extensible arm, one end connected to the platform of the vehicle and the other end connected to a sensor, and used to detect objects located above or below the ground. The apparatus in question basically consists of a platform for a vehicle; a reach-in arm (2) mounted on the platform; a sensor (3) attached to the other end of the extensible arm with a quick-connect interface (4); at least one motor controller (7) that is electronically connected to the extended arm and the sensor and provides control of their movements; a computer that is wired or wirelessly connected to the extended arm, sensor and motor controller and processes data from the sensor to detect and diagnose underground objects and running a software program that uses automatic target detection/identification/recognition algorithms and enables the sensor movement to be controlled automatically according to the pre-programmed software or manually according to the guidance commands provided by the user/operator via the input device. The movement and height of the extensible arm and sensor to detect the above-ground or underground object can be directed according to pre-programmed software running on the computer, as well as automatic computer commands can be overridden by the manual control feature of the apparatus and directed by the user/operator according to the commands entered into the input device connected with the computer. The platform on which the extendible arm is mounted is a manned or unmanned vehicle or tank; the extending arm can be a telescopic or an articulated arm or a carrier system and can be also controlled remotely. In an application of the patent in which the extensible arm is articulating, the extending arm consists of multiple segments (10) connected by joints (9). Joints where conventional connection mechanisms such as hinges are used have an electronic connection with the computer and the angular and linear position indicators of each joint transferred to the computer are processed by the computer to determine the position of each segment of the extensible arm and the direction and direction it will move. The sensors used in the system to detect aboveground and underground objects or to follow the distance of the objects on the sensor's path to the sensor; There may be conventional sensor types such as Ground Penetrating Radars (GPR), metal detectors, seismic detectors, acoustic detection devices, quadruple resonance imaging, LIDAR, LASER. The apparatus can contain multiple sensors, each of which can detect a different object. Thanks to the quick-connect connection element (quick-connect device), which is used to connect the sensor to the extensible arm and includes the breakaway system and spring mechanism, in cases where the sensor is damaged, malfunctioned or stuck on the scanned surface, instead of replacing the entire platform, it is ensured that the sensor can be detached from the reachable arm quickly and easily, and the new sensor can be quickly installed manually or automatically. The motor controller, which is electronically connected to the extendable arm and the sensor and provides their movements; it contains at least one motor operating according to electric, hydraulic or pneumatic movement mechanisms.

In the prior art, US patent document numbered U.S. Pat. No. 6,026,135 discloses an apparatus and method for detecting mines using multiple sensors mounted on a remotely controllable vehicle and physically marking the location of the mined area with paint so that they can then be neutralized. Sensors installed in the vehicle are electromagnetic induction (EMI) sensor, ground-penetrating radar (GPR), infrared sensor, and thermal neutron activation (TNA) sensor. The system basically consists of; a remote-controlled detection vehicle (RDV 5), GPR sensor (4) that detects magnetic irregularities in the target area by means of transmitting and receiving antennas (11) that send high-frequency electromagnetic signals underground and collect the reflected signals, EMI sensor (3) which detects metals buried underground by means of transmitting and receiving coils (12) those are arranged linearly over each other, as in the arrangement of fish scales on one or more trays (14) with beveled edges, forward-looking infrared camera (FLIR 2) that is placed facing downwards in front of the vehicle (RDV 5) to scan the ground approximately 4 meters in front of the EMI sensor and provides detection of underground irregularities according to differences in emissivity and reflected temperature parameters and warns in case of detection, a TNA sensor (6) that verifies whether objects detected by the other sensors (GPR, EMI, FLIR) are actually mines, a navigation system (41) that enables the determination of the coordinates of the moving vehicle relative to the ground, vehicle control system also known as processor (50) that performs operations such as coordination of navigational information and remote control of the vehicle by passing the warnings from the sensors through the data fusion process in order to determine the coordinates of the object detected by the sensors according to the location and to place the TNA sensor on these coordinates. The RDV (5), which can be controlled remotely by wireless RF connection, is a hydrostatic self-propelled vehicle and its pressure on the ground is too low to activate anti-tank mines. While the GPR sensor is mounted right in front of the vehicle, the front edges of the trays (14), on which the EMI sensor transmitting and receiving coils (12) are placed, are connected to non-metal support structure extending from the front of the vehicle by means of rotating pivots (16) to prevent possible metallic interference from the vehicle (RDV 5) or GPR sensor on the EMI sensor. This allows the EMI sensor to be connected to the vehicle by crawling on the ground in front of the GPR sensor and approximately 3.5 meters away from the vehicle. Thanks to the arrangement of the EMI sensor coils overlapping each other like a fish scale and the sensor being dragged on the ground, a minimum gap is created between the coils and the ground. In addition, thanks to the connection of the trays which holds EMI coils to the support structure with shafts, the rotary movement of the trays around the shaft ensures the flexibility of the EMI sensor and keeping a minimum distance from the ground against irregularities in the ground structure that may damage the sensor or the support structure. Since the TNA sensor is heavy, it is transported in a trailer (20) connected by a rotating hitch swivel (25) and a telescoping tongue (26) to the rear of the vehicle (RDV 5) to keep the pressure applied to the ground low and to prevent the anti-tank mines detected during ground scanning from detonating when passed over. The coordinates of the potential mine object passed over by the vehicle after detection by GPR, EMI, and FLIR sensors mounted in front of the vehicle. Since the TNA sensor, which uses data from other sensors to reduce the false alarm rate (FAR), can only verify when the vehicle is stationary and is in a fixed position on the target object, the confirmatory TNA connected to the rear of the vehicle is positioned exactly on the coordinates of the target object by slowing down the vehicle (RDV 5) in a controlled manner and the vehicle is stopped before using the TNA sensor to verify whether the object is a mine or not. Each of the GPR, EMI and FLIR sensors determines the location of the irregularities they detected, according to their specific coordinate systems. Since these sensors are fixedly positioned relative to the vehicle, the sensors' own coordinate systems can be easily converted to the vehicle's (RDV 5) coordinate system. However, since the vehicle (RDV 5) is in motion during the scanning activity and passes over the coordinate where the irregularity is detected by the sensors, the detected irregularity must be located in the world coordinate system. For this reason, the coordinates of the remote-controlled detection device (RDV 5) in motion are monitored by the navigation system according to the world coordinate system. When an irregularity or an object is detected underground by the sensors (GPR, EMI, FLIR) mounted in front of the vehicle, the coordinates of this detected object according to the sensors, together with the previously determined coordinates of these sensors relative to the vehicle (RDV 5) and the coordinates of the vehicle (RDV 5) determined by the navigation system based on the ground are used by the vehicle control system (processor) to determine the coordinates of the object detected by the sensors. On the other hand, the warnings given by the sensors regarding the detection of the object with the possibility of being a mine are also passed through the data fusion process in a control station (52) within the vehicle control system (processor). With this process, it is decided whether the object underground that causes the sensors to give a warning is actually related to the target object to be detected, and if it is evaluated as a target object, it is decided whether the verification process should be performed using the TNA sensor on the detected object. If it is decided to make verification with the TNA sensor, the vehicle (RDV 5) is slowed down in a controlled manner and the TNA sensor carried in the trailer behind the vehicle is positioned exactly on the determined coordinates of the target object detected by other sensors, and the vehicle is completely stopped for the verification process. When the target object is verified as a mine by the TNA sensor, the coordinates where the mine is located are marked with a temporary paint that does not harm the environment by the marker on the trailer where the TNA sensor is carried in order to be able to deactivate or destroy it later.

U.S. Pat. No. 7,467,810 discloses an apparatus for transporting a sensor having a sensing surface at an operational distance from a target surface. The apparatus includes an upper frame and spaced apart parallel front and rear struts. The upper ends of the struts are connected to the upper frame. The lower ends of the struts are connected to the sensor. The front and rear struts pivot about the upper frame to move the sensor in response to an obstacle on the target surface, The sensor pivots about the lower ends of the front and rear struts to maintain the sensing surface in substantially parallel orientation to the target surface.

EP1972964 discloses a portable Mine Detection System, developed for the detection of landmines, which is a system consisting of electromagnetic induction sensor, ground penetrating radar and flexible air suction channel for the vapour sensor. The system includes two main parts which are back unit and hand unit and it is controlled with the help of pushbuttons and LCD screen. The system has two different modes called detection and identification. While an alarm is automatically generated for the presence of buried object in the former mode, the type of the detected object is predicted by using artificial intelligence based identification methods in the latter one. The user is informed with audible and visual warnings when processed sensor signals are presented to the user via LCD screen.

US 2008/0036644 discloses a radar device, in particular a hand-held short-range radar for determining the location of objects enclosed in a medium, including at least one radar sensor, which generates a first, high-frequency detection signal for penetrating a medium to be tested in such a way that information about an object enclosed in the medium can be obtained by measuring and analyzing the reflected detection signal of the radar sensor. At least one additional sensor is provided for generating at least one additional, second detection signal for obtaining information about the object enclosed in the medium.

Vehicle-mounted mine detection (VMMD) systems in use on the market include; Husky VMMD (Husky MK II, Husky MK III, Husky 2G), STMR Array, Vallon Multi-Sensor Detection System VMV8, IAI-ELTA ELI-3375 Counter IED & Counter Mine Suite (CIMS) and Schiebel VAMIDS Vehicular Array Mine Detection System.

Ground-penetrating radar (GPR) with high-sensitivity metal detectors (EMI) that apply low pressure to the ground and thus have the ability not to detonate the mine even if the antitank passes over the mine (overpass capable), rapid field repair Husky VMMD, which includes alternative sensor combinations such as such, is manufactured by the South African company DCD Protected Mobility (DCD PM) and provides rapid detection of all kinds of mines, bombs and handmade explosives with low false alarm levels, trapped above ground or underground. It processes the data received from the sensors using Automatic Target Detection/Recognition algorithms and provides real-time information about the location, depth, and dimensions of the object, giving an audible warning and providing three-dimensional imaging. The upper surface of the place where the target object is detected in the light of audible and visual information is marked with the paint sprayed manually or automatically by the marking device attached to the vehicle. Components on the front and rear of the Husky VMMD are modularly configured (modular/frangible configuration) so that they can be predictably disassembled in the event of an explosion. In this way, any damage to the system can be repaired quickly in the field. VISOR™ 2500 GPR antennas, which are developed by NIITEK company within the American Chemring Group, are capable of detecting both plastic and metal-containing mines and explosives in an area consisting of 4 panels arranged side by side, with automatic or manual height adjustment, and a search width of 3 meters. While it is mounted on the front, metal detectors are carried under the vehicle body. Thanks to the GPR Panel Positioning System (GPR Panel Positioning System), which has a hydraulic control mechanism, the movement of the search coil consisting of GPR antennas mounted in front of the vehicle can be controlled and the height of the sensors can be adjusted automatically or manually according to different terrain conditions. Thus, the Husky VMMD can be used easily without damaging the sensors on different ground types (flat, bumpy, upward sloping, downward sloping) by adjusting the height of the GPR sensors from the ground. In addition, the Husky VMMD can operate in the unmanned mode, thanks to its semi-autonomous control capability, allowing the operator to remotely control all functions of the vehicle.

STMR Array (The Single Transmit Multiple Receive Array) produced by Minelab, is a vehicle-mounted metal detector system which is used for detecting Unexploded Ordnance—UXO, Explosive Remnants of War—ERW and mines during military and humanitarian demining operation. STMR Array consists of a research head that includes a wide transmit coil and multiple receiver coils, power supply and electronic units. Minelab metal detectors use the "Multi-Period Sensing" (MPS) method which is a patented pulse induction technology. Common metal detectors use a single pulse width. On the other hand, Minelab detectors with MPS use pulses with variable width. This provides more information about detected objects and increases the detection depth of buried UXO threats. Also, MPS provides sensitive detection of AP/AT mines independent of mineral level in the soil and reduces false alarm rates. A Uniform magnetic field is formed along STMR Array sensor head to avoid blind spots that prevent the detection of target objects and to achieve the same sensitivity level along with the sensor head. Besides, "BiPolar Pulse Induction" method is used to avoid activating magnetically triggered mines for a more secure search. STMR sensor head is modular and repair or replacement of parts is easy. STMR array can be hung on a lifting arm attached to either front or backside of the vehicle. STMR array can be dragged over the surface by mounting on a plate that is resistant to corrosion and tied to an arm fixated on the front side of vehicle. Also, it can be dragged over the surface by mounting on a plate that is directly tied to the back side of the vehicle. Whatever the vehicle mounting method is, sensor head is supposed to touch the surface for the best performance. STMR Array can be customized according to customer needs. The width of the search head can be changed and the search head can be integrated with GPR, a thermal projection device, or other sensors.

VMV8 (Vehicle Mounted Multi-Sensor Detection System) is produced by a German company called Vallon GmbH. VMV8 consists of 8 channel EMI based on pulse induction technology to detect metallic mines, Unexploded Ordnance—UXO and Explosive Remnants of War—ERW. VMV8 has the option to be extended with 16 channel GPR to detect mines and IEDs with low or nonmetallic content. EMI coils and GPR antennas are lined up side by side along the search head. The number of sensors and sensor types can be changed according to the need for search width. Search head can be mounted on the vehicle in any direction by using support arms and can be dragged on surface by using a trailer or plate. VALLON EVA2000® 2.X software runs on a computer and receives data from EMI and GPR sensors, then it can record and process this data in real-time. Depth, position, and other calculated values of target objects can be displayed in real-time.

IAI-ELTA ELI-3375 Counter IED & Counter Mine Suite (CIMS), produced by Israel Aerospace Industries—IAE, can be mounted on any manned or unmanned tactical vehicle. CIMS can detect mines and IEDs which are buried of close to the surface, also bombs trapped roadside. CIMS aims at increasing PD (probability of detection) and decreasing FAR (false alarm rate) by integrating different types of sensors which are mainly Above-surface Detection System—ADS and Underground Mine and IED Detection System—MIDS. ADS is placed upon vehicle and consists of side-looking synthetic aperture radar—SAR, high-resolution optical detection system, and multi-spectral infrared visualization system. ADS is used for the detection of hidden or camouflaged mines and IEDs over or close to earth surface. MIDS is the wide and rectangular sub-system mounted closely to the front side of the vehicle and consists of EMI (metal detector) and GPR (Ground Penetrating Radar). These various sensor sub-systems are connected through central processing and management unit to increase the ability of detecting, mapping, and categorizing mines and IEDs according to parameters such as weight, type, destructive power, etc. in real-time.

The features that distinguish the invention which is the subject of the present patent application from the vehicle-mounted dual- or multi-sensor metal or mine detectors in the prior art are the following: while the height of a search head from the ground is adjusted, at the time same, the search head is kept parallel to the ground by using only one linear actuator in the system, and the dimensions of the search head are reduced through placing the ground penetrating radar (GPR sensor) antennas in the search head inside the metal detector (EMI sensor) coils without the occurrence of interference effect that could cause false alarm. Keeping the search head parallel to the ground is an important factor for the sensors to perform at their best and therefore at least two actuators are used in the vehicle mounted metal/mine detection systems that are the subject of the patents in the prior art or in use on the market, at least one of which is used for adjusting the height of the search head including sensors from the ground during the detection operation according to the terrain conditions (flat, sloping, rough), and at least another one of which is used for keeping the search head parallel to the ground while adjusting its height from the ground. In the present patent application, one linear actuator, that is connected to a mechanism comprised of a lower arm and an upper arm for moving the search head, not only adjusts the height of the search head from the ground, but also keeps it parallel to the ground. Moreover, in the search head of dual-sensor (including EMI and GPR) metal/mine detectors in the prior art, metal detector (EMI) coils and ground-penetrating radar (GPR) antennas are lined up side by side. However, in the vehicle mounted metal/mine detector of the present patent application, dimensions of the search head are reduced by placing the GPR antennas inside the EMI coils without occurrence of any interference effect, thus facilitating the access to the narrow or coastal operation areas where the detection is to take place, and increasing the detection/identification performance.

Purpose of the Invention

An object of the invention is to develop a vehicle mounted metal and mine detector enabling the use of only one linear actuator for the cost-effective operation of the four-bar mechanism for raising the search head being kept parallel to the ground while adjusting the height of the search head comprising the sensors for the detection and identification of the above-ground and underground target objects.

Yet another objective of the invention is to develop a vehicle mounted metal and mine detector with modular search head, the sizes of which are reduced by placing GPR sensor antennas into the space in the middle of the EMI sensor (metal detector) coils in the search head, and thus enabling easy access to narrow operation areas where the detection is to take place, and the size of which can also be changed by changing the number of sensors inside it according to the need for the detection width.

Yet another objective of the invention is to develop a vehicle mounted metal and mine detector the working performance of which is not affected by external factors such as weather and field conditions by passing the cables which transmit signals and power between the search head and the vehicle to which the search head is mounted, through the structures forming the four-bar mechanism for moving the search head, and by covering the mechanisms for actuating the four-bar mechanism by means of the upper shell of the vehicle.

Yet another objective of the invention is to develop a vehicle mounted metal and mine detector wherein the search head is mounted to the vehicle by means of the quick-connect connection components, allowing easy and quick replacement of the search head with a new one on site when the search head is damaged by striking, or gets stuck on a surface, or the sensors inside the search head is broken, and wherein the quick-connect connection components are broken off by themselves and thus the search head is also broken off from the vehicle when the vehicle strikes an object, or an explosion occurs, which protects the rest of the vehicle from the effects of a strike or an explosion.

DESCRIPTIONS OF THE FIGURES

Figure 3:
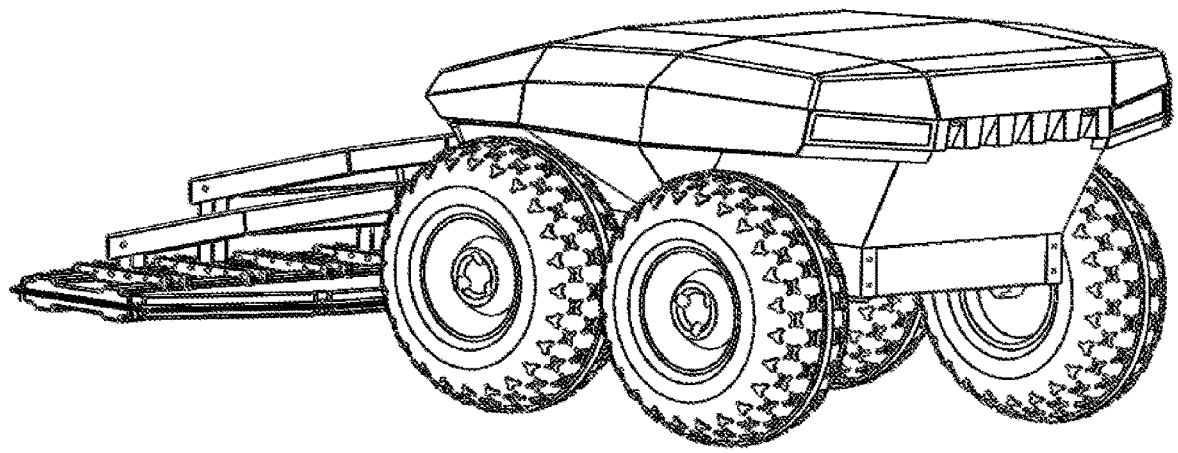
Figure 4:
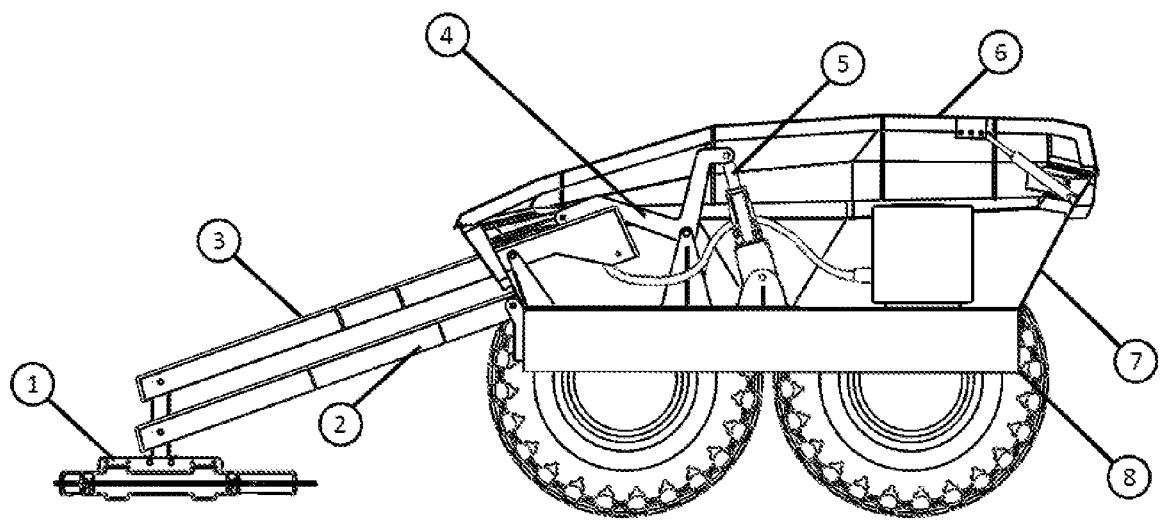
Figure 5:
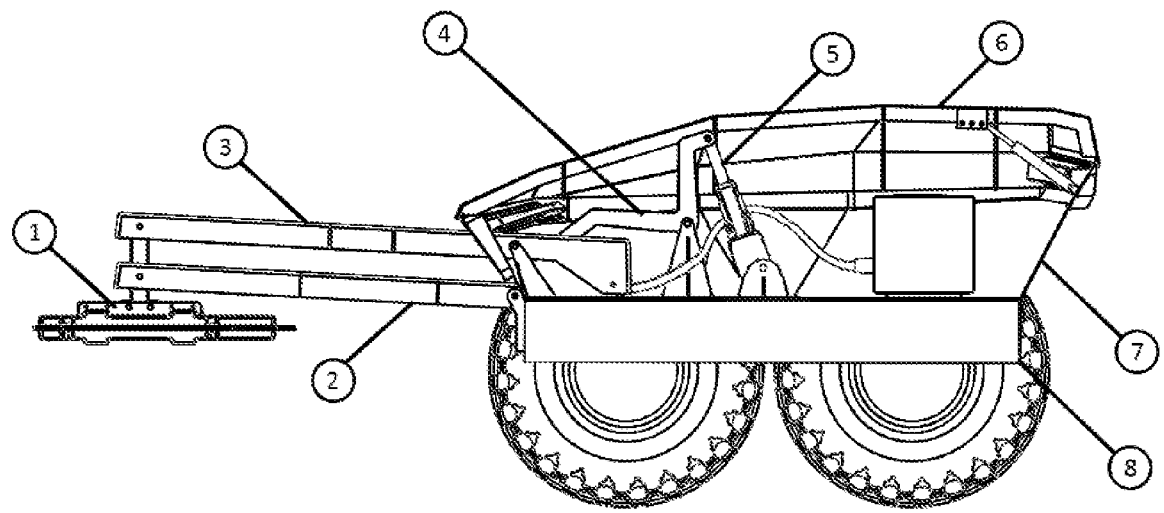

Brief descriptions of the figures are listed below:

FIG. 1: Isometric perspective drawing of the vehicle mounted metal and mine detector with the upper shell (6) in open position FIG. 2: Isometric perspective drawing of the vehicle mounted metal and mine detector with the upper shell (6) in closed position FIG. 3: Isometric perspective drawing of rear view of the vehicle mounted metal and mine dedector FIG. 4: Sectional view of the vehicle mounted metal and mine dedector when the search head (1) is lowered to the ground FIG. 5: Sectional view of the vehicle mounted metal and mine dedector when the search coil (1) is raised above the ground FIG. 6: Sectional view of the four-bar mechanism FIG. 7: Exploded perspective drawing of the search head (1)

DESCRIPTIONS OF THE REFERENCES IN THE FIGURES

The descriptions regarding the parts/features, for which the reference signs shown in the figures are used, are listed below:
- 1: Search head
- 2: Lower arm
- 3: Upper arm
- 4: Lever arm
- 5: Linear actuator
- 6: Upper shell
- 7: Lower shell
- 8: Manned or unmanned ground vehicle
- 9: Fore arms
- 10: Rear arms
- 11: Ground Penetrating Radar (GPR) antennas
- 12: Metal dedector (EMI) coils
- 13: Ribs
- A: Connection point where the lower arm (2) is connected to the search head (1)
- B: Connection point where the upper arm (3) is connected to the search head (1)
- C: Connection point where the upper arm (3) is connected to the lower shell (7)
- D: Connection point where the lower arm (2) is connected to the lower shell (7)
- E: Connection point where the linear actuator (5) is connected to the upper arm (3)

DISCLOSURE OF THE INVENTION

Figure 6:
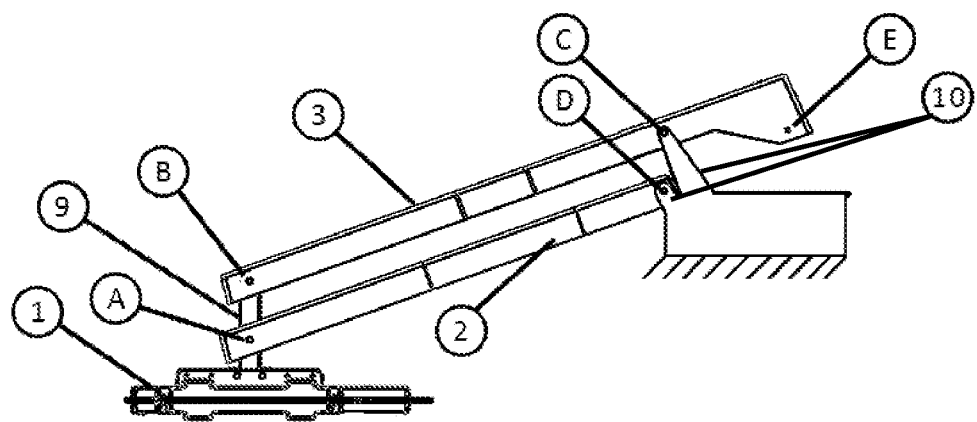

Vehicle mounted metal and mine dedector which is the subject of this invention basically comprises; the lower arm (2), the upper arm (3), the lever arm (4), the linear actuator (5) which are all attached to the lower shell (7) of the manned or unmanned ground vehicle (8) by means of rotary connection components, and the dual sensor search head (1) having a compact structure fastened to the lower arm (2) and to the upper arm (3) with rotary linkage, which comprises an electromagnetic induction (EMI) sensor and a ground penetrating radar (GPR) which produce an alarm when detecting above ground or underground anomalies. The opposite sides of the lower arm (2) and the upper arm (3) (AD side and BC side) are parallel to each other and the distances between the opposite connection points are equal to each other (|AD|=|BC|; |AB|=|CD|) in the four-bar mechanism which is formed as a result of connections made by the lower arm (2) and upper arm (3) with the searching head (1) and the vehicle's lower shell (7) as shown in FIG. 6. In other words, the distance (|AD|) between point A at which the lower arm (2) is connected to the search head (1) by means of the fore arms (9) and the point D at which the lower arm is connected to the vehicle's lower shell (7) by means of the rear arms (10) is equal to the distance (|BC'|) between point B at which the upper arm (3) is connected to the search head (1) by means of the fore arms (9) and the point C at which the upper arm is connected to the vehicle's lower shell (7). Furthermore, the distance (|AB|) between the points (A, B) at which the lower arm (2) and the upper arm (3) are connected to the search head (1) by means of the fore arms (9) is also equal to the distance (|CD|) between the points (C, D) at which the lower arm and the upper arm are connected to the lower shell (7) of the vehicle by means of the rear arms (10). It is ensured that the search head (1) is kept parallel to the ground while it is raised from the ground by keeping the distances between the opposite connection points in the four-bar mechanism (FIG. 6), which is comprised of the lower arm (2), upper arm (3), fore arms (9) and rear arms (10), equal to each other. Keeping the search head and thus the sensors inside it parallel to the ground is an important factor in terms of high-accuracy target detection without the loss of sensitivity while the height of the sensors from the ground is changing. However, it is also possible for the search head (1) to make angular movement in a way that the search head forms an angle with respect to the ground during its rising movement from the ground by rendering that the distances between the opposite connection points at which the lower arm (2) and the upper arm (3) are connected to the search head (1) and to the lower shell (7) of the vehicle with rotating links are not equal.

Figure 2:
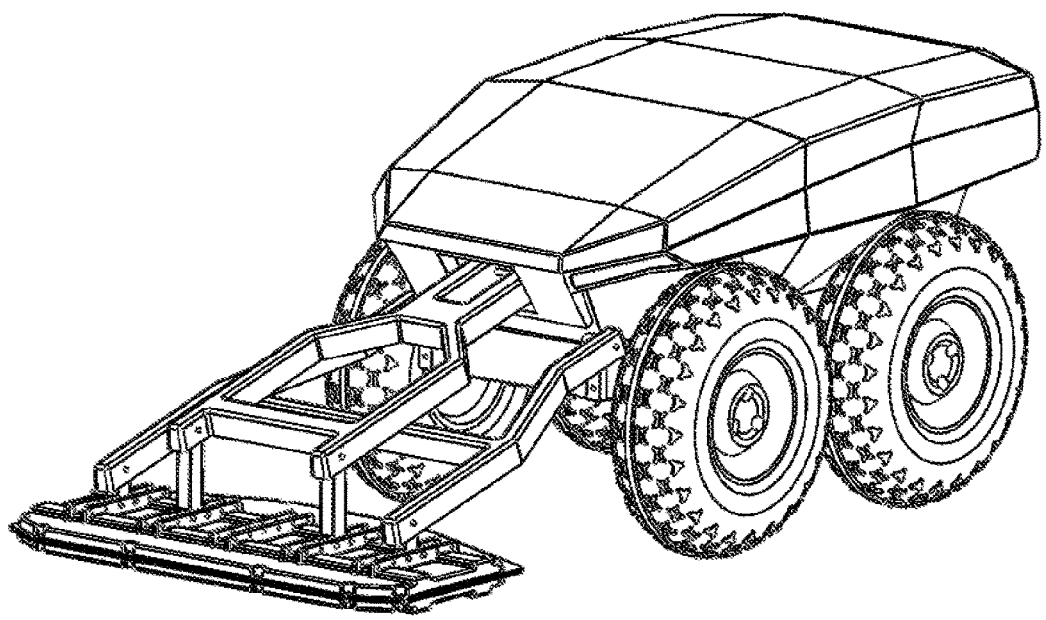

By elongating the upper arm (3), beginning from the point C (FIG. 6) at which the upper arm (3) forms a rotary connection with the lower shell of the vehicle (7), towards the vehicle (8) by passing through the opening in front of the lower shell (7) of the vehicle as shown in FIG. 1 and in FIG. 2, the linear actuator (5) that actuate the mechanism is connected with the rotating connection to the point E on the elongated part of the upper arm. Thus, the height of the search head (1) from the ground can be adjusted by means of the lever arm (4) with the movement provided by only one linear actuator (5) from the rotating connection point (point E) that connects the upper arm (3) to the linear actuator (5). Lever arm (4) is connected both to the upper arm (3) as well as to the linear actuator (5) with rotating links. The position where the linear actuator (5) will be mounted on the vehicle (8) can be adjusted and the placement of the actuator at the determined mounting point can be made easily owing to the use of lever arm (4). Moreover, since the lever arm (4) enables the length of the linear actuator (5) in open and closed positions to become smaller, and enables the area the linear actuator occupies on the vehicle to be reduced, making it possible to achieve a vehicle design with less volume requirement and high storage efficiency.

In the figures showing an embodiment of the invention, the upper arm (3) is shown to be connected to the linear actuator (5) and to the lever am (4) through elongating the upper arm (3), beginning from the point C at which the upper arm is connected to the lower shell (7) of the vehicle with a rotating link, towards inside of the vehicle (8) by passing through the opening in front of the lower shell (7) of the vehicle. Likewise, it is possible to adjust the height of the search head (1) while keeping it parallel to the ground by providing it with movement in the case of elongating the lower arm (2), beginning from the mounting point (point D shown in FIG. 6) at which the lower arm is connected to the lower shell (7) of the vehicle with a rotating link, to enter it into the inside of the vehicle (8) from the opening in front of the lower shell (7) of the vehicle, and then connecting the linear actuator (5) and the lever arm (4) to the elongated end of the lower arm with rotating links.

A linear spring and/or a viscous damper is also connected where the lever arm (4) is connected to at least one of the lower arm (2) and the upper arm (3) with a rotating link. Unlike the four-bar mechanism (four-bar linkage) in the prior art, as seen in FIG. 1 and FIG. 2, either one of the lower arm (2) and the upper arm (3) is elongated in a way that it enters inside the vehicle through the opening in front of the lower shell (7) of the vehicle (8), and the lever arm (4) and the linear actuator (5) are connected to the elongated arm, resulting that the lever arm and the linear actuator remain stored inside the structure comprised of the upper shell (6) and the lower shell (7), and are therefore protected from the external factors that may adversely affect the working performance. The mechanical component selection and design is also facilitated through the isolation of these mechanisms against external effects due to being remained stored between the upper shell (6) and the lower shell (7). The upper shell (6) is connected to the lower shell (7) at the rear of the vehicle by means of the rotating connection components, and there is/are a piston or pistons connected to the shells with the rotating links between the upper shell (6) and the lower shell (7). Thus, the upper shell (6) can be brought from the closed position to the open position, and the maintenance of the mechanisms placed between the upper shell (6) and the lower shell (7) can be performed easily by opening the upper shell (6). Moreover, when the upper shell (6) is closed on the lower shell (7), the area formed between them that is protected from external factors can also be used for storage purposes.

Figure 7:
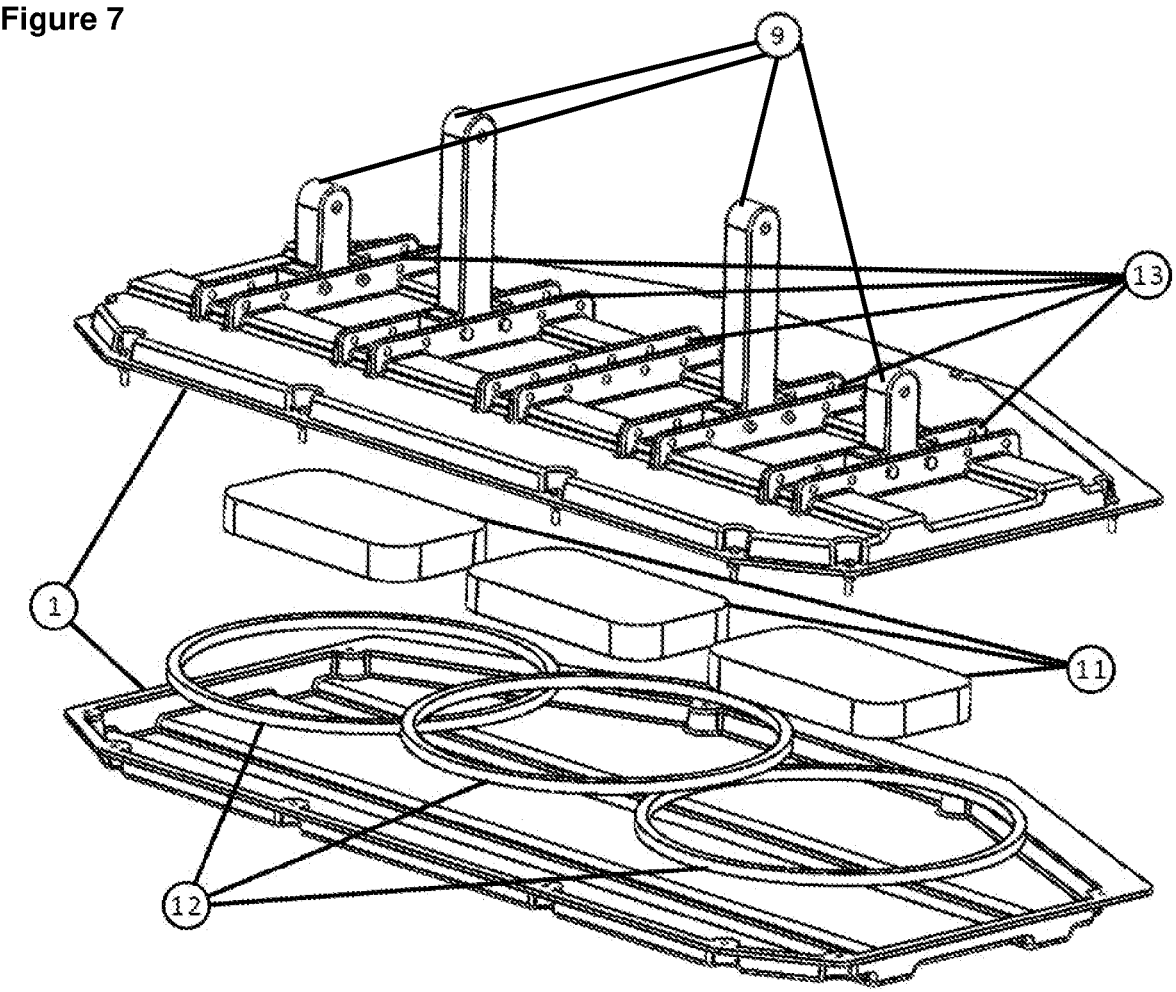

In the search head (1), whose exploded perspective drawing is shown in FIG. 7, GPR transmitter and receiver antennas (11) are placed in the space in the middle of the transmitter and receiver coils (12) of the EMI sensor (metal detector), which reduces the size of the search head, thus facilitating the access to the narrow or coastal areas where the detection activities take place, and enhancing the performance relating to the detection and identification of mines and explosives. There are also charged or uncharged battery and wireless communication equipment in the search head (1). On the upper surface of the search head (1), there are ribs (13) which are in the form of protrusions with holes, and are arranged parallel to each other at certain distances. The fore arms (9) are either fixed directly on the search head (1) or fixed between the ribs (13) by means of pins and pear shape linch pins or segments that are attached to the pins. The search head (1) is connected to the lower arm (2) and to the upper arm (3) with the rotating links by means of the quick-connect hitch pins inserted into the holes on the fore arms (9) and the pear-type pins or segments attached to the pins. When the search head (1) strikes an object, gets stuck on a surface, or is damaged by an explosion during the screening procedures in the field, the pins are broken by themselves and the search head (1) is broken off from the lower arm (2) and the upper arm (3) due to the attachment of the search head (1) with the lower arm (2) and the upper arm (3) by means of the pins that can be connected and disconnected easily, thus preventing the rest of the system from being damaged. In cases where the sensors are damaged or malfunctioning, the search head can be easily removed and replaced with a new one on site without the need for special equipment, and the system can be rendered ready to use within a short time.

The cables carrying signals and power between the search head (1) and the vehicle (8) pass through the inverted U-shaped lower arm (2) and upper arm (3). The cables are kept away from the search head by being fastened into the lower arm (2) and the upper arm (3), which prevents false alarms caused by the effect of interference created when the metal-containing cables are in motion with respect to the EMI coils in the search head. Moreover, thanks to the isolation of the cables inside the lower arm (2) and the upper arm (3) against external factors, it is ensured that the system operates smoothly and safely in rainy weather and wetland conditions.

Even though FIG. 7, as an embodiment of the invention, shows that the search head (1) contains three metal detector (EMI) coils (12) and three radar (GPR) antennas (11) placed inside the coils, the modular search head can be narrowed or expanded by changing the number of sensors inside it according to the needs regarding the detection width. The search head (1), in which the sensors are placed, is produced by injection molding method, preferably using plastic or plastic composite materials material in order not to create an interference effect on the metal detector (12). For the same reason, preferably plastic or composite (glass fiber) materials are used in the production of the lower arm (2), upper arm (3), fore arms (9) and rear arms (10) which are comprised in the four-bar mechanism connecting the search head (1) to the vehicle (8). It is preferred to use an electric linear actuator as a drive mechanism in the system due to its high efficiency as a result of its ability to apply high lifting force. As a second option, the height of the search head can be adjusted by connecting a motor generating a torque to at least one of the connection points (points C and D shown in FIG. 6) where the lower arm (2) or the upper arm (3) is connected to the lower shell (7) of the vehicle by the rotating link.

The vehicle mounted metal and mine detector is designed such that the center of gravity of the vehicle is in the middle of the vehicle wheels, which leads to a substantial decrease in the noise generated in the target signals received from the sensors due to vibrations caused by the movement of the vehicle, thus enabling the detection of the target objects with high accuracy rate.

INDUSTRIAL APPLICATION OF THE INVENTION

The metal and mine detector with a modular structure, being the subject of the invention, which can be mounted into any manned or unmanned ground vehicle, and offering two and/or three-dimensional high-resolution underground imaging and very fast data collection without damaging the detection area, is used in the defence industry for the detection and identification of metal or non-metal landmines, improvised explosive devices (IED), detonator cables of IED, explosive remnants of war (ERW), unexploded ordnances (UXO), and bombs, intended for the military or humanitarian operations regarding the clearance of landmine and/or unexploded ordnance; in the archaeological studies for the non-destructive detection of the buried archaeological remains and artifacts by remote sensing without physical contact; in the structural geological and stratigraphic researches for obtaining the understanding of soil stratigraphy, and for the detection of geological units close to the ground surface, the mapping of faults/fractures/ crevices/cracks, and the monitoring of groundwater levels; in the surface and subsurface investigation carried out for finding out the geological-geophysical characteristics of a site and its immediate surroundings to determine whether there is any drawback of building structures such as railway, highway, bridge, subway, overpass, tube tunnel, water tunnel etc., and to determine the parameters regarding a site area required for the construction site design; and in the detection of old or unrecorded city infrastructures (sewerage, canal, pipeline, shelter, electricity and telephone lines, etc.), areas of industrial waste dumps, and the buried metal or plastic pipes and cables. The number of the sensors (EMI, GPR) in the search head connected by means of the quick-connect rotating connection components to the lower arm and the upper arm that are mounted to the vehicle can be increased or decreased according to the need for the detection width. When the modular search head is crashed into a field, gets stuck on a surface or is damaged by an explosion, the quick-connect components connecting the search head to the lower and upper arms are broken off by themselves and the rest of the vehicle is prevented from being damaged. The damaged or broken search head can be easily replaced with a new one on site without the need for any special equipment.

The invention claimed is:

1. A vehicle mounted metal and mine detector comprisings
    a manned or unmanned ground vehicle (8),
    a lower arm (2) and an upper arm (3) that are connected to a lower shell (7) of the vehicle with rotating links by means of rear arms (10),
    fore arms (9) that are fastened directly on a search head (1) or to ribs (13) placed on the search head, and that enable the search head (1) to be connected to the lower arm (2) and to the upper arm (3) with quick-connect rotating connection components,
    a linear actuator (5) that is connected to either one of the lower arm (2) or the upper arm (3) and to the lower shell (7) of the vehicle,
    a lever arm (4) that is connected by means of rotating links to the lower shell (7) of the vehicle, to the linear actuator (5), and to the lower arm (2) or the upper arm (3) which is connected to the linear actuator (5) wherein
    an edge between the connection points (A, D), at which the lower arm (2) is mounted to the search head (1) and the lower -2-hell (7) of the vehicle, and an edge between the connection points (B, C), at which the upper arm (3) is mounted to the search head (1) and the lower -2-hell (7) of the vehicle, are parallel to each other and equal in length,
    a distance (|AB|) between the points (A, B) at which the lower arm (2) and the upper arm (3) are connected to the search head (1) by means of the fore arms (9) is equal to a distance (|CD|) between the points (C, D) at which the lower arm and the upper shell connected to the lower shell (7) of the vehicle by means of the rear arms (10),
    the search head (1) comprising at least one metal detector transmitter and receiver coil (12) operating according to the principle of electromagnetic induction, and at least one ground penetrating radar transmitter and receiver antenna (11) placed inside the coil (12),
    the lower arm (2) or the upper arm (3), to which the linear actuator (5) and the lever arm (4) are connected with the rotating links, is elongated from the connection point (C or D), at which the lower arm or the upper arm is mounted to the lower shell (7) of the vehicle, to be inserted inside the vehicle (8) through an opening in front of the lower shell (7).

2. The vehicle mounted metal and mine detector according to claim 1 further comprising an upper shell (6) which covers the mechanisms placed on the lower shell (7) of the vehicle to isolate them against external factors, and is connected to the lower shell (7) with a rotating link.

3. The vehicle mounted metal and mine detector according to claim 2 further comprising at least one piston which is placed between the upper shell (6) and the lower shell (7) and is connected to the upper shell (6) and to the lower shell (7) with the rotating link.

4. The vehicle mounted metal and mine detector according to claim 1 further comprising pins, that are inserted into holes on the fore arms (9), and pear-type pins or segments attached to the pins for connecting the search head to the lower arm (2) and the upper arm (3) with the rotating links.

5. The vehicle mounted metal and mine detector according to claim 1 wherein cross sections of the lower arm (2) and the upper arm (3) are inverted U-shaped.

6. The vehicle mounted metal and mine detector according to claim 5 wherein the inverted U-shaped lower arm (2) and upper arm (3) are mounted to the vehicle such that their ends face towards the search head (1).

7. The vehicle mounted metal and mine detector according to claim 6 further comprising cables passing through the lower arm (2) and the upper arm (3) for transmitting signal and power between the search head and the vehicle.

8. The vehicle mounted metal and mine detector according to claim 1 further comprising a charged or uncharged battery that is placed in the search head (1).

9. The vehicle mounted metal and mine detector according to claim 1 further comprising wireless communication equipment placed in the search head (1).

10. The vehicle mounted metal and mine detector according to claim 1 further comprising a linear spring and/or a viscous damper placed between the lever arm (4) and the lower arm (2) or the upper arm (3) by being connected to them with the rotating links.

11. The vehicle mounted metal and mine detector according to claim 10, further comprising a linear spring and/or a viscous damper placed between the lever arm (4) and the linear actuator (5) by being connected to them with the rotating links.

12. The vehicle mounted metal and mine detector according to claim 1 further comprising a linear spring and/or a viscous damper placed between the lever arm (4) and the linear actuator (5) by being connected to them with the rotating links.

* * * * *